US010129426B2

United States Patent
Negoro

(10) Patent No.: US 10,129,426 B2
(45) Date of Patent: Nov. 13, 2018

(54) IMAGE FORMING APPARATUS HAVING DISPLAY SCREEN WITH POSITION CONFIGURABLE ICONS, INFORMATION PROCESSING METHOD, AND COMPUTER-READABLE RECORDING MEDIUM

(71) Applicant: Shigeo Negoro, Tokyo (JP)

(72) Inventor: Shigeo Negoro, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/132,375

(22) Filed: Apr. 19, 2016

(65) Prior Publication Data

US 2016/0316088 A1    Oct. 27, 2016

(30) Foreign Application Priority Data

Apr. 24, 2015  (JP) ................................. 2015-089381

(51) Int. Cl.
*H04N 1/00* (2006.01)
*G06F 9/451* (2018.01)
(Continued)

(52) U.S. Cl.
CPC ....... *H04N 1/00938* (2013.01); *G06F 3/0483* (2013.01); *G06F 3/04817* (2013.01);
(Continued)

(58) Field of Classification Search
None
See application file for complete search history.

(56) References Cited

U.S. PATENT DOCUMENTS 5,832,298 A    11/1998  Sanchez et al.
7,506,259 B1    3/2009  Narayanaswami et al.
(Continued)

FOREIGN PATENT DOCUMENTS

| CN | 102957827 A | 3/2013 |
|---|---|---|
| CN | 104469056 A | 3/2015 |
| JP | 2013-003625 | 1/2013 |

OTHER PUBLICATIONS

European Search Report dated Sep. 26, 2016.
(Continued)

*Primary Examiner* — Miya J Williams
(74) *Attorney, Agent, or Firm* — Harness, Dickey & Pierce, P.L.C.

(57) ABSTRACT

An image forming apparatus includes a main body and an operation unit. The main body includes: a first storage storing device information of the apparatus; and a notifying unit notifying the operation unit of the device information when the apparatus starts up. The operation unit includes: a second storage storing placement information of display information associated with an instruction to process an application for the apparatus, and correspondence information of the device information and the placement information; an acquiring unit acquiring the device information; a selecting unit selecting placement information corresponding to the device information from the placement information; a checking unit checking whether an application of placement display information placed based on the placement information, has been installed on the apparatus; a placing unit placing the placement display information on a display information screen; and a display control unit displaying the display information screen with the placement display information.

10 Claims, 13 Drawing Sheets

(51) Int. Cl.
- G06F 3/0488 (2013.01)
- G06F 9/445 (2018.01)
- G06F 3/14 (2006.01)
- G06F 3/0481 (2013.01)
- G06F 3/0483 (2013.01)
- G06F 8/61 (2018.01)

(52) U.S. Cl.
CPC .......... G06F 3/04883 (2013.01); G06F 9/451 (2018.02); H04N 1/00411 (2013.01); H04N 1/00424 (2013.01); H04N 1/00503 (2013.01); H04N 1/00928 (2013.01); G06F 3/14 (2013.01); G06F 8/61 (2013.01); G09G 2340/14 (2013.01); G09G 2354/00 (2013.01); H04N 2201/0075 (2013.01); H04N 2201/0094 (2013.01)

(56) References Cited

U.S. PATENT DOCUMENTS

| | | | |
|---|---|---|---|
| 8,305,606 B2 | 11/2012 | Negoro | |
| 9,137,402 B2 | 9/2015 | Fukasawa | |
| 9,774,635 B2 | 9/2017 | Han | |
| 9,971,883 B2* | 5/2018 | Negoro | G06F 21/30 |
| 2009/0063710 A1 | 3/2009 | Sekine et al. | |
| 2010/0073160 A1* | 3/2010 | Gilmour | G06F 3/04817 340/540 |
| 2010/0146450 A1* | 6/2010 | Harada | G06F 17/30126 715/838 |
| 2011/0013214 A1 | 1/2011 | Kaida et al. | |
| 2012/0129503 A1* | 5/2012 | Lindeman | H04W 4/001 455/414.1 |
| 2012/0233538 A1 | 9/2012 | Negoro | |
| 2013/0091452 A1* | 4/2013 | Sorden | G06F 3/048 715/771 |
| 2013/0194633 A1* | 8/2013 | Takatsu | G06F 3/1211 358/1.15 |
| 2013/0208306 A1* | 8/2013 | Fukasawa | G06F 3/1205 358/1.15 |
| 2014/0082747 A1 | 3/2014 | Negoro et al. | |
| 2014/0282490 A1 | 9/2014 | Shinomiya et al. | |
| 2015/0082389 A1 | 3/2015 | Han | |
| 2015/0169183 A1* | 6/2015 | Son | G06F 3/0482 715/765 |
| 2015/0193469 A1* | 7/2015 | Hagiwara | G06F 17/30241 345/589 |
| 2015/0199079 A1 | 7/2015 | Negoro | |
| 2015/0373211 A1* | 12/2015 | Minamikawa | H04N 1/00474 358/1.15 |
| 2015/0378707 A1* | 12/2015 | Park | G06F 3/0486 717/174 |
| 2016/0028907 A1* | 1/2016 | Kato | H04N 1/00514 358/1.13 |

OTHER PUBLICATIONS

Office Action for Corresponding Chinese Patent Application No. 201610250788.0 dated Mar. 27, 2018 and English translation thereof.

* cited by examiner

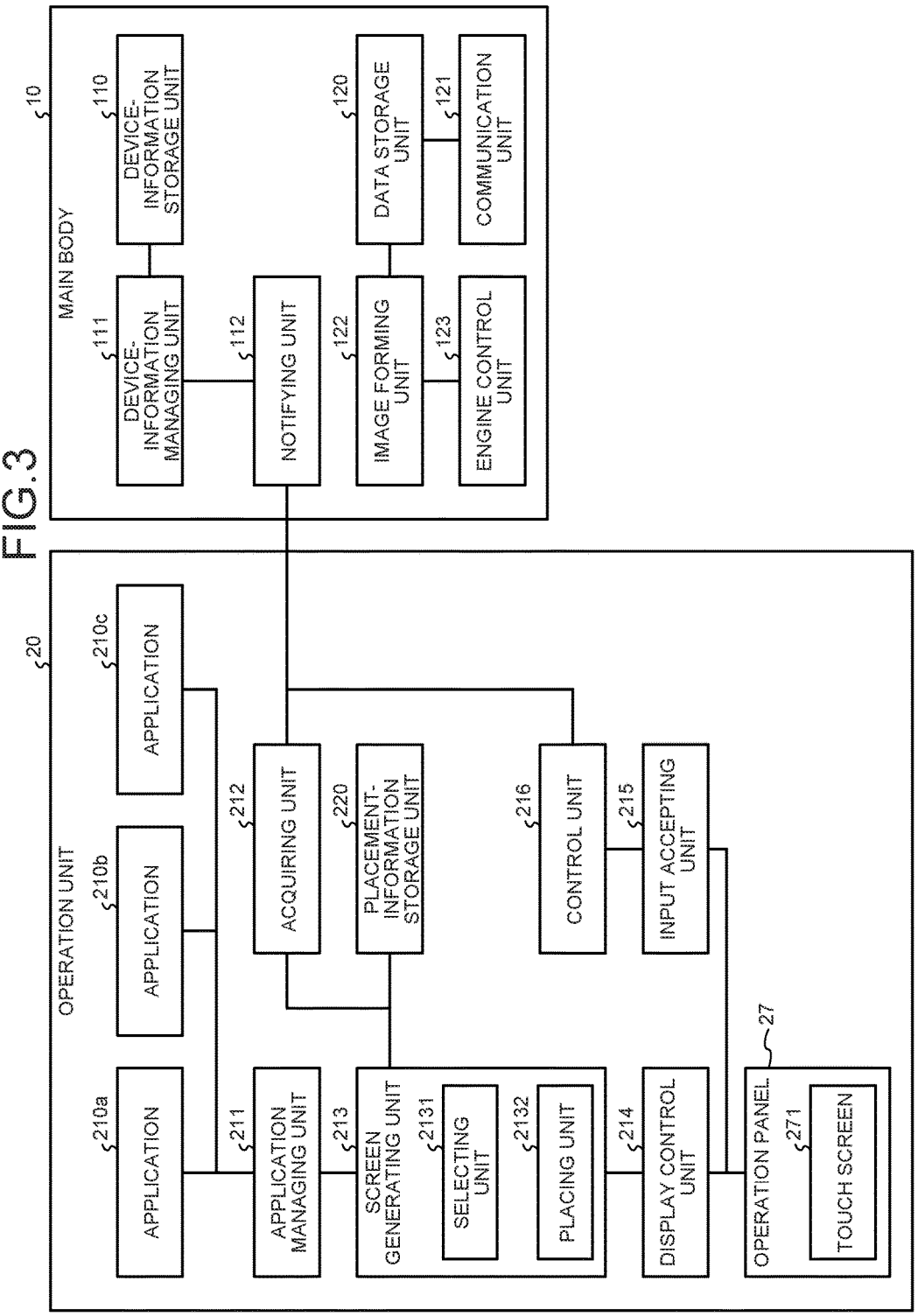

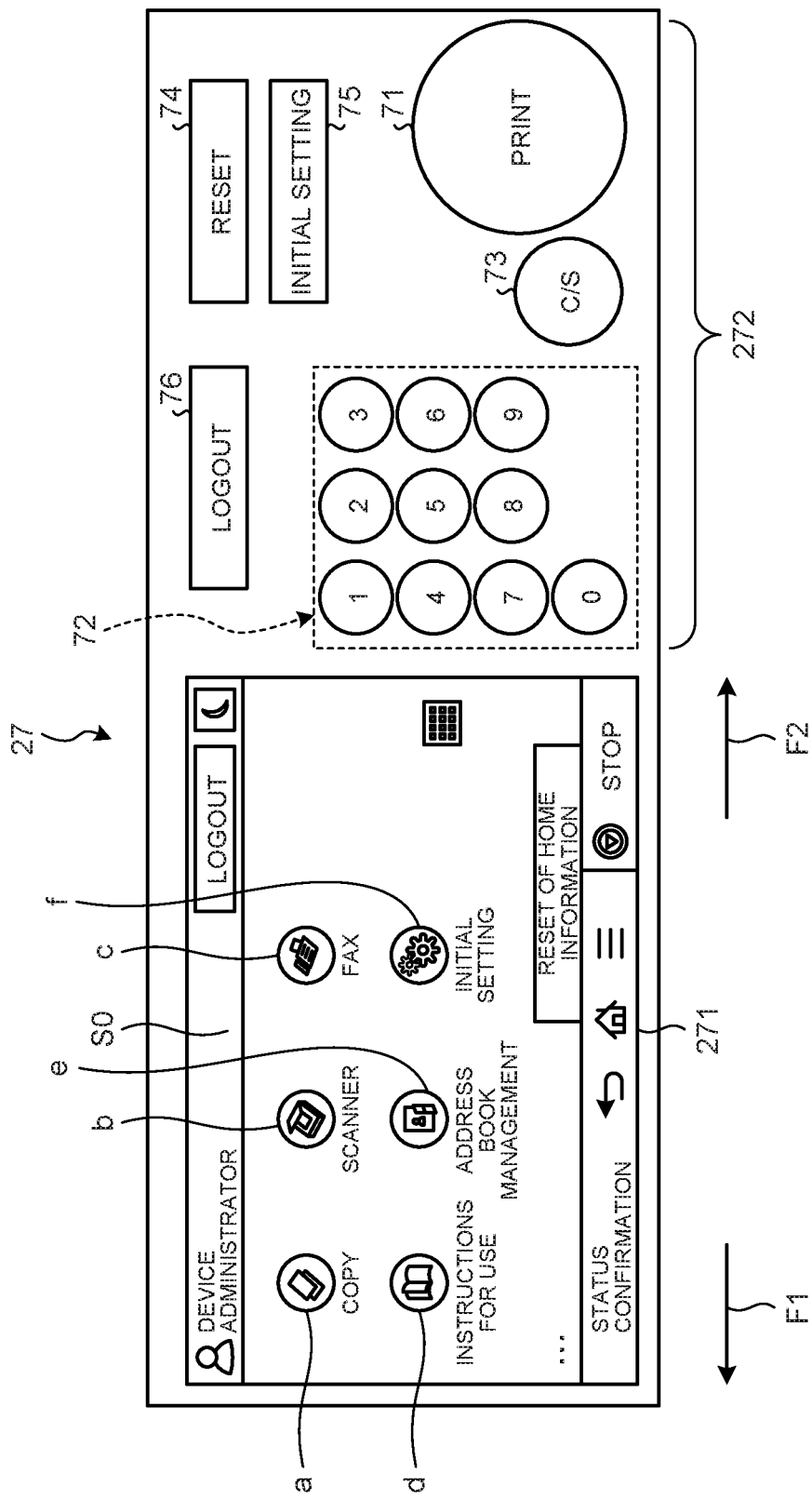

FIG.5

```
<ShortcutPatternList>
<Pattern = A> //CONDITIONS FOR PATTERN A AS PLACEMENT POSITION INFORMATION
 <conditions>
        <destination>NA</destination>//DESTINATION INFORMATION IS NA
 </conditions>
</Pattern>
<Pattern = B> //CONDITIONS FOR PATTERN B AS PLACEMENT POSITION INFORMATION
 <conditions>
        <destination>NA</destination>//DESTINATION INFORMATION IS NA AND
<machineName>Metis-C1</machineNam>//MACHINE NAME IS Metis-C1
 </conditions>
</Pattern>
<ShortcutPatternList>
```

FIG.6

```
<IconList>

<tr>
    <th>// FIRST CELL OF FIRST ROW
        <appliName = "ApplicationA">//APPLICATION NAME
        <iconFile = "ApplicationA.jpg">//FILE NAME
</th>
    <th>// SECOND CELL OF FIRST ROW
        <appliName = "ApplicationB">
        <iconFile = "ApplicationB.jpg">
</th>
 .
 .
        <th>// FIFTH CELL OF FIRST ROW
        <appliName = "ApplicationE">
        <iconFile = "ApplicationE.jpg">
</th>
</tr>
<tr>
    <th>// FIRST CELL OF SECOND ROW
        <appliName = "ApplicationF">
        <iconFile = "ApplicationF.jpg">
</th>
 .
 .
 .
</tr>

```

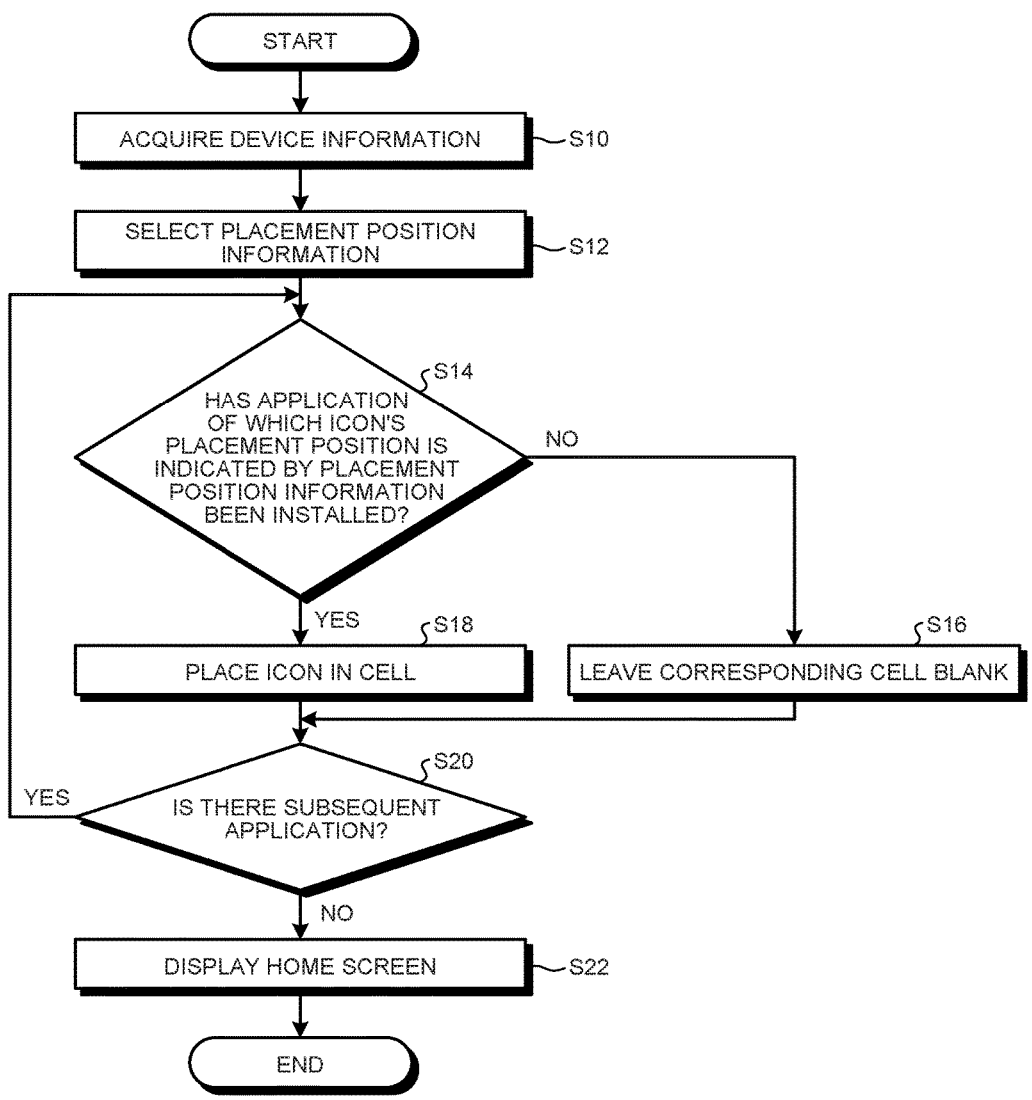

FIG.9

```
<IconList>

<priority/>
<cell>FIRST PRIORITY ON PAGE 1 (AS IT'S WRITTEN FIRST)
        <appliName = "ApplicationA">//APPLICATION NAME
        <iconFile = "ApplicationA.jpg">//FILE NAME
</cell>
<cell>SECOND PRIORITY ON PAGE 1 (AS IT'S WRITTEN SECOND)
        <appliName = "ApplicationB">//APPLICATION NAME
        <iconFile = "ApplicationB.jpg">//FILE NAME
</cell>
<cell>THIRD PRIORITY ON PAGE 1 (AS IT'S WRITTEN THIRD)
        <appliName = "ApplicationC">//APPLICATION NAME
        <iconFile = "ApplicationC.jpg">//FILE NAME
</cell>

<priority/>
<cell>FIRST PRIORITY ON PAGE 2 (AS IT'S WRITTEN FIRST)
    .
    .
    .
```

IMAGE FORMING APPARATUS HAVING DISPLAY SCREEN WITH POSITION CONFIGURABLE ICONS, INFORMATION PROCESSING METHOD, AND COMPUTER-READABLE RECORDING MEDIUM

CROSS-REFERENCE TO RELATED APPLICATIONS

The present application claims priority to and incorporates by reference the entire contents of Japanese Patent Application No. 2015-089381 filed in Japan on Apr. 24, 2015.

BACKGROUND OF THE INVENTION

1. Field of the Invention

The present invention relates to an image forming apparatus, an information processing method, and a computer-readable recording medium.

2. Description of the Related Art

Conventionally, there is already known an image forming apparatus that is configured to allow the installation of an application, which implements a function in the image forming apparatus, on an operation unit of the image forming apparatus, and the operation unit has multiple applications pre-installed. Then, there is known a technology to display a home screen (a display information screen) with multiple shortcut icons (also referred to simply as "icons") of installed applications placed on the operation unit.

In recent years, there has been disclosed a technology to provide a customization function to an operation unit of an image forming apparatus. Furthermore, there has also been disclosed a technology to update a home screen with each installation of an application added to an image forming apparatus. For example, there is an image processing apparatus that allows the addition of an icon of a software development kit (SDK) application while maintaining the positions of icons on a customized home screen (for example, see Japanese Laid-open Patent Publication No. 2013-003625). A technology disclosed in Japanese Laid-open Patent Publication No. 2013-003625 determines whether or not to automatically place an icon of an installed SDK application according to whether a home screen is customized or not.

However, such conventional image forming apparatus has a problem that when the initial placement of shortcut icons on a home screen differs according to the destination (the country or region where image forming apparatus is used) or model of image forming apparatus, etc., it is necessary to use different firmware for each destination or model to produce image forming apparatus, which decreases production efficiency.

In view of the above-described conventional problem, there is a need to provide an image forming apparatus, information processing method, and a computer-readable recording medium having a computer program that can use common firmware even when the initial placement of shortcut icons differs according to the destination or model of image forming apparatus, etc., thereby improving production efficiency.

SUMMARY OF THE INVENTION

It is an object of the present invention to at least partially solve the problems in the conventional technology.

Exemplary embodiments of the present invention, there is provided An image forming apparatus comprising a main body unit and an operation unit, wherein the main body unit includes: a first storage unit configured to store therein device information on the image forming apparatus; and a notifying unit configured to notify the operation unit of the device information acquired from the first storage unit on the startup of the image forming apparatus, and the operation unit includes: a second storage unit configured to store therein placement information, which is information on placement of display information associated with an instruction to process an application available in the image forming apparatus, and correspondence information in which the device information is associated with the placement information; an acquiring unit configured to acquire the device information from the main body unit; a selecting unit configured to select placement information corresponding to the acquired device information from pieces of placement information stored in the second storage unit; a checking unit configured to check whether an application of placement display information, which is a piece of display information placed based on the selected placement information, has been installed on the image forming apparatus; a placing unit configured to place, when the application of the placement display information has been installed, the placement display information on a display information screen, which is a screen on which one or more pieces of display information are displayed, based on the selected placement information; and a display control unit configured to display the display information screen with the placement display information placed on a display unit.

Exemplary embodiments of the present invention also provide an information processing method implemented by an operation unit of an image forming apparatus, the operation unit including a storage unit configured to store therein placement information, which is information on placement of display information associated with an instruction to process an application available in the image forming apparatus, and correspondence information in which device information on the image forming apparatus is associated with the placement information, the information processing method comprising: acquiring the device information; selecting placement information corresponding to the acquired device information from pieces of placement information stored in the storage unit; checking whether an application of placement display information, which is a piece of display information placed based on the selected placement information, has been installed on the image forming apparatus; placing, when the application of the placement display information has been installed, the placement display information on a display information screen, which is a screen on which one or more pieces of display information are displayed, based on the selected placement information; and displaying the display information screen with the placement display information placed on a display unit.

Exemplary embodiments of the present invention also provide a non-transitory computer-readable recording medium having a computer program executed by a computer including a storage unit configured to store therein placement information, which is information on placement of display information associated with an instruction to process an application available in the computer, and correspondence information in which device information on the computer is associated with the placement information, the program causing the computer to execute: acquiring the device information; selecting placement information corresponding to the acquired device information from pieces of placement information stored in the storage unit; checking whether an application of placement display information, which is a piece of display information placed based on the selected placement information, has been installed on the computer; placing, when the application of the placement display information has been installed, the placement display information on a display information screen, which is a screen on which one or more pieces of display information are displayed, based on the selected placement information; and displaying the display information screen with the placement display information placed on a display unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram showing a functional configuration example of the MFP according to the first embodiment;

FIG. 4 is a diagram showing the appearance of an operation panel;

FIG. 5 is a diagram showing an example of a conditional expression stored in the MFP according to the first embodiment;

FIG. 6 is a diagram showing an example of placement position information stored in the MFP according to the first embodiment;

FIG. 8 is a flowchart showing the flow of a home-screen display process performed by the MFP according to the first embodiment;

FIG. 9 is a diagram showing an example of placement order information stored in an MFP according to a second embodiment of the present invention;

DETAILED DESCRIPTION OF THE PREFERRED EMBODIMENTS

Exemplary embodiments of an image forming apparatus, information processing method, and a computer-readable recording medium having a computer program according to the present invention are described in detail below with reference to accompanying drawings. In the following description, there is described an example in which the image forming apparatus according to the present invention is applied to a multifunction peripheral (MFP); however, the present invention can be applied to any image forming apparatus, such as a copier, a printer, a scanner device, or a facsimile machine, as long as the image forming apparatus includes an operation unit. Incidentally, the MFP is a device having at least any two of the following functions: copy function, scanner function, printer function, and fax function.

First Embodiment

Figure 1:
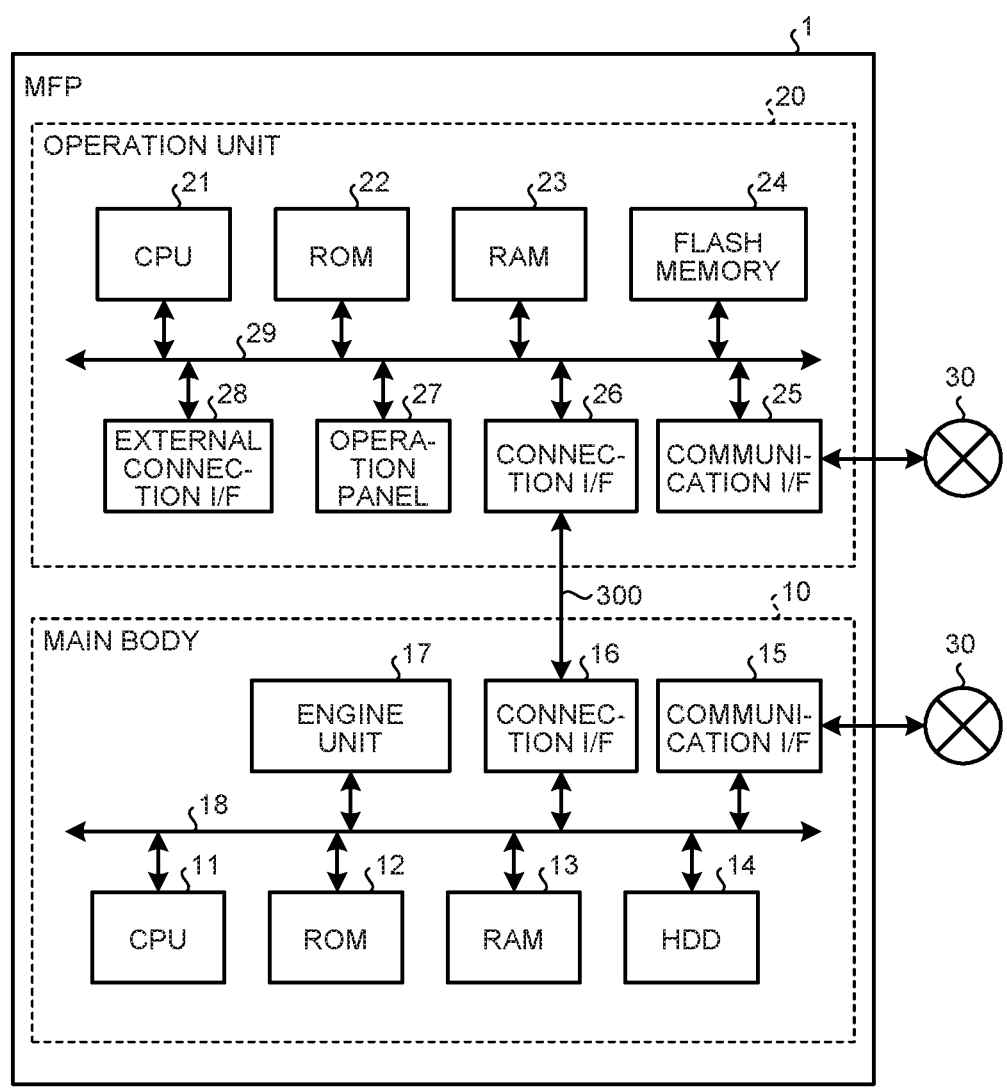
FIG. 1 is a block diagram showing a hardware configuration example of an MFP according to a first embodiment of the present invention.

FIG. 1 is a block diagram showing a hardware configuration example of an MFP according to a first embodiment of the present invention. As shown in FIG. 1, an MFP 1 includes a main body 10 and an operation unit 20; the main body 10 can implement various functions such as copy function, scanner function, fax function, and printer function, and the operation unit 20 accepts an input according to a user's operation. The main body 10 and the operation unit 20 are connected via a dedicated communication path 300 so that they can communicate with each other. As the communication path 300, for example, one based on the universal serial bus (USB) standard can be used, or any other standard-based one can also be used regardless of whether wired or wireless.

Incidentally, the main body 10 can act according to an operation accepted by the operation unit 20. Furthermore, the main body 10 can communicate with an external device such as a client personal computer (PC) as well, and can also act according to an instruction received from the external device.

First, a hardware configuration of the main body 10 is explained. As shown in FIG. 1, the main body 10 includes a CPU 11, a ROM 12, a RAM 13, a hard disk drive (HDD) 14, a communication interface (I/F) 15, a connection I/F 16, and an engine unit 17; these components are connected to one another via system bus 18.

The CPU 11 controls the operation of the main body 10 overall. The CPU 11 executes a program stored in a storage, such as the ROM 12 or the HDD 14, using the RAM 13 as a work area, thereby controlling the operation of the entire main body 10 and realizing various functions such as the above-mentioned copy function, scanner function, fax function, and printer function.

The communication I/F 15 is an interface for connecting to a network 30. The connection I/F 16 is an interface for communicating with the operation unit 20 via the communication path 300.

The engine unit 17 is hardware that performs general information processing and processing except for communication in order to implement copy function, scanner function, fax function, and printer function. The engine unit 17 includes, for example, a scanner (an image reading unit) that reads an image of an original by scanning the original; a printer (an image forming unit) that performs printing on a sheet member, such as a sheet of paper; and a fax unit that performs fax communication. The engine unit 17 can further include specific optional components, such as a finisher for sorting print-outs and an automatic document feeder (ADF) for automatically feeding originals.

Next, a hardware configuration of the operation unit 20 is explained. As shown in FIG. 1, the operation unit 20 includes a CPU 21, a ROM 22, a RAM 23, a flash memory 24, a communication I/F 25, a connection I/F 26, an operation panel 27, and an external connection I/F 28; these components are connected to one another via a system bus 29.

The CPU 21 controls the operation of the operation unit 20 overall. The CPU 21 executes a program stored in a storage, such as the ROM 22 or the flash memory 24, using the RAM 23 as a work area, thereby controlling the operation of the entire operation unit 20 and realizing various functions to be described later, such as display of information (an image) according to an input accepted from a user.

The communication I/F 25 is an interface for connecting to the network 30. The connection I/F 26 is an interface for communicating with the main body 10 via the communication path 300.

The operation panel 27 accepts various inputs according to user's operations, and displays thereon various screens and a variety of information (for example, information according to an accepted operation, information that indicates the operating status of the MFP 1, information that indicates the settings, etc.). Details of the operation panel 27 will be described later (see FIG. 4).

The external connection I/F 28 is an interface for connecting to a peripheral device such as an IC card reader.

Figure 2:
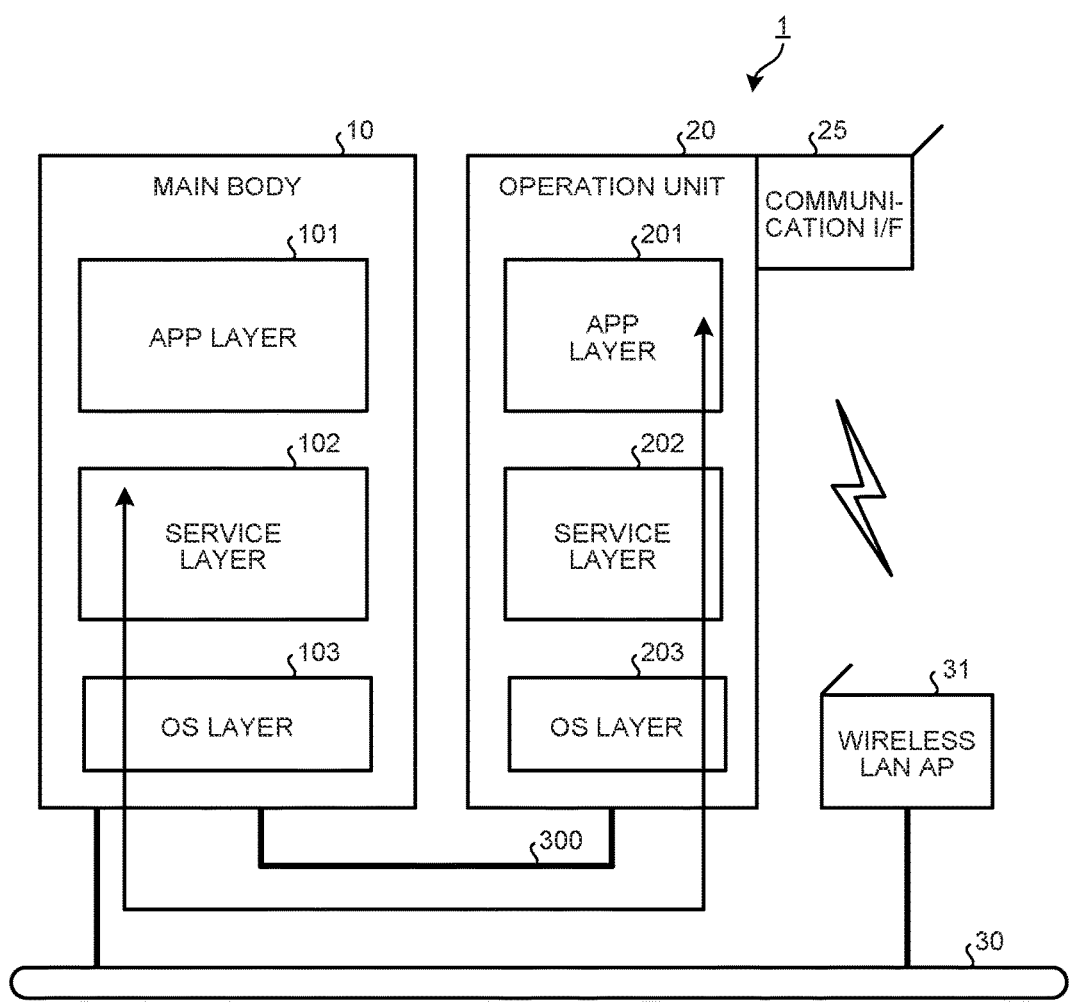
FIG. 2 is a schematic diagram showing an example of a software configuration of the MFP according to the first embodiment.

Subsequently, a software configuration of the MFP 1 is explained. FIG. 2 is a schematic diagram showing an example of a software configuration of the MFP according to the first embodiment. As shown in FIG. 2, the main body 10 has an app layer 101, a service layer 102, and an OS layer 103. Entities of the app layer 101, the service layer 102, and the OS layer 103 are software stored in a storage such as the ROM 12 or the HDD 14. The CPU 11 executes the software, thereby various functions are provided.

The software of the app layer 101 is software for operating a hardware resource thereby providing a given function, and is referred to as application software (in the following description, may be referred to simply as "app" or "application"). Examples of apps include a copy app for providing copy function, a scanner app for providing scanner function, a fax app for providing fax function, a printer app for providing printer function, etc.

The software of the service layer 102 is software that lies between the app layer 101 and the OS layer 103 and is for providing an app with an interface for using a hardware resource that the main body 10 includes. More specifically, the software of the service layer 102 is software for providing a function of accepting an operation request to a hardware resource and mediating the operation request. Possible operation requests accepted by the service layer 102 include a request to the scanner for reading, a request to the printer for printing, etc.

Incidentally, the interface function provided by the service layer 102 can be provided not only to the app layer 101 of the main body 10 but also to an app layer 201 of the operation unit 20. That is, the app layer 201 (an app) of the operation unit 20 can also realize a function using a hardware resource (for example, the engine unit 17) of the main body 10 via the interface function of the service layer 102.

The software of the OS layer 103 is basic software (an operating system) for providing a basic function of controlling hardware resources that the main body 10 includes. The software of the service layer 102 converts a request for use of a hardware resource from an app into a command that the OS layer 103 can interpret, and passes the command to the OS layer 103. Then, the software of the OS layer 103 executes the command, thereby the hardware resource operates in accordance with the request from the app.

Likewise, the operation unit 20 has the app layer 201, a service layer 202, and an OS layer 203. The hierarchical structure of the app layer 201, the service layer 202, and the OS layer 203 that the operation unit 20 has is the same as the main body 10 side. However, functions provided by apps of the app layer 201 and types of operation requests that the service layer 202 can accept are different from the main body 10 side.

Some apps of the app layer 201 can be software for operating a hardware resource that the operation unit 20 includes, thereby providing a given function; however, apps of the app layer 201 are mostly software for providing user interface (UI) functions for the operations or the displays pertaining to the functions that the main body 10 has (for example, the copy function, the scanner function, the fax function, and the printer function).

Incidentally, in the present embodiment, to maintain the independence of the functions, the software of the OS layer 103 of the main body 10 side and the software of the OS layer 203 of the operation unit 20 side are different from each other. That is, the main body 10 and the operation unit 20 operate independently of each other on different operating systems. For example, Linux (trademark) can be used as the software of the OS layer 103 of the main body 10 side, and Android (trademark) can be used as the software of the OS layer 203 of the operation unit 20 side.

As described above, in the MFP 1 according to the present embodiment, the main body 10 and the operation unit 20 operate on different operating systems, so communication between the main body 10 and the operation unit 20 is performed not as inter-process communication in a common device but as communication between different devices. The operation of transmitting information (content of an instruction from a user) accepted by the operation unit 20 to the main body 10 (command communication), the operation of the main body 10 notifying the operation unit 20 of an event, etc. fall under this. Here, the operation unit 20 performs command communication with the main body 10, thereby can use a function of the main body 10. Examples of events notified to the operation unit 20 by the main body 10 include the operation executing state of the main body 10, contents set on the main body 10 side, etc.

Furthermore, in the present embodiment, electric power to the operation unit 20 is supplied from the main body 10 via the communication path 300; therefore, the power control of the operation unit 20 can be performed separately from (independently of) the power control of the main body 10.

Incidentally, in this example, the main body 10 and the operation unit 20 are electrically and physically connected via the communication path 300; alternatively, the operation unit 20 can be configured to be removable from the main body 10. In this case, the main body 10 and the operation unit 20 are both provided with a near field communication unit, such as an infrared communication unit, a radio frequency (RF) communication unit, or a Bluetooth™ communication unit. Or, the main body 10 and the operation unit 20 can be provided with a wireless local area network (LAN) communication function, such as Wi-Fi (trademark), so that they can communicate with each other via a wireless LAN access point (a wireless LAN AP) 31 and the network 30 as shown in FIG. 2. In the case where the operation unit 20 is removable from the main body 10, the operation unit 20 accumulates electric power supplied from the main body 10 via the communication path 300 in a secondary battery, and, when removed from the main body 10, operates using the electric power accumulated in the secondary battery and performs communication with the main body 10.

Subsequently, functions of the MFP 1 according to the first embodiment are explained. FIG. 3 is a diagram showing a functional configuration example of the MFP according to the first embodiment. As shown in FIG. 3, the main body 10 includes a device-information managing unit 111, a notifying unit 112, a communication unit 121, an image forming unit 122, and an engine control unit 123 that are functions (modules) realized by the CPU 11 executing a program. The main body 10 further includes a device-information storage unit 110 and a data storage unit 120.

The device-information storage unit 110 stores therein device information that is information on the MFP 1, and is realized by the HDD 14 or the ROM 12. The device information in the present embodiment includes destination information, which indicates the location where the MFP 1 is used (the country or region where the MFP 1 is sold), and the model name of the MFP 1. The device-information storage unit 110 according to the present embodiment stores therein the destination information and model name of the MFP 1 as device information; alternatively, either one of the destination information and model name of the MFP 1 can be stored as the device information, or information on another MFP 1 can be further stored as device information. Incidentally, the device-information storage unit 110 corresponds to a first storage unit described in Claims.

The device-information managing unit 111 manages device information stored in the device-information storage unit 110. In the present embodiment, for example, the device-information managing unit 111 acquires device information from the device-information storage unit 110 when the MFP 1 has been started (on the startup of the MFP The notifying unit 112 notifies the operation unit 20 of a variety of information; in the present embodiment, the notifying unit 112 notifies the operation unit 20 of device information acquired from the device-information storage unit 110 by the device-information managing unit 111 on the startup of the MFP 1.

The data storage unit 120 stores therein print data output from the MFP 1, and is implemented by the HDD 14 or the ROM 12.

The communication unit 121 transmits/receives a variety of information to/from an external device, such as a personal computer (PC), via the network 30. In the present embodiment, the communication unit 121 receives information, such as print data, from an external device, and stores the received information in the data storage unit 120.

The image forming unit 122 performs predetermined image processing on print data received from an external device or data read by the scanner, etc. The engine control unit 123 controls the engine unit 17 (see FIG. 1) and causes the engine unit 17 to output the print data. The engine unit 17 outputs (prints) an image based on the print data in accordance with the control by the engine control unit 123.

Furthermore, the operation unit 20 includes applications 210a, 210b, and 210c, an application managing unit 211, an acquiring unit 212, a screen generating unit 213, a display control unit 214, an input accepting unit 215, and a control unit 216 that are functions (modules) realized by the CPU 21 executing a program. The operation unit 20 further includes a placement-information storage unit 220 and the operation panel 27.

As described above, the operation panel 27 accepts various inputs according to user's operations, and displays thereon various screens and a variety of information. FIG. 4 is a diagram showing the appearance of the operation panel 27. As shown in FIG. 4, the operation panel 27 includes a touch screen (a display unit) 271 and a keyboard 272.

The touch screen 271 accepts various inputs and displays thereon various screens and a variety of information. The touch screen 271 is, for example, a liquid crystal display (LCD) with touch panel function or an organic EL display with touch panel function. In the present embodiment, a home screen, which is a display information screen that displays thereon a list of icons of applications available in the MFP 1, is displayed on the touch screen 271. Incidentally, the configuration of the touch screen 271 is not limited to this; any other configuration can be adopted as long as the touch screen 271 can display thereon an image and accept an operation according to the image. Furthermore, an icon is display information associated with an instruction to process an application available in the MFP 1.

The home screen displayed on the touch screen 271 has multiple pages, and the display page can be switched to another page by a flick operation. On a home screen S0 shown in FIG. 4, for example, a flick of user's finger to the left (an arrow F1) moves the display page to the previous page; a flick of user's finger to the right (an arrow F2) moves the display page to the next page. Furthermore, respective shortcut icons (a to f) of multiple applications can be placed on one page of the home screen S0.

The keyboard 272 is a set of hardware keys, and accepts various inputs. The keyboard 272 includes a PRINT key 71, a ten-key pad 72, a CLEAR key 73, a RESET key 74, an INITIAL SETTING key 75, and a LOGOUT key 76.

The PRINT key 71 is a key for accepting an instruction to start a copy operation. The ten-key pad 72 is a keypad for accepting the specified number of copies, etc. The CLEAR key 73 is a key for accepting an instruction to initialize a specified item, such as the specified number of copies, input through the ten-key pad 72 (for example, to restore the number of copies to a predetermined value such as "1"). The RESET key 74 is a key for accepting an instruction to initialize a specified item, such as the specified copying magnification or the specified scanning resolution. The INITIAL SETTING key 75 is a key for accepting an instruction to move the display screen to an initial setting screen, such as an initial print setting screen. The LOGOUT key 76 is a key for accepting a logout operation.

Incidentally, in addition to (or instead of) the display function that the operation panel 27 has, a lamp or the like can be provided as a display unit. Furthermore, the operation panel 27 can be composed of, for example, the touch screen 271 only without the keyboard 272.

Referring back to FIG. 3, the placement-information storage unit 220 stores therein placement information that is information on the placement of icons on the home screen displayed on the touch screen 271 of the operation panel 27, and is realized by the flash memory 24 or the ROM 22. The placement information in the present embodiment is placement position information that indicates the position on the home screen where an icon is placed. In other words, the placement position information is information that indicates what icon is placed in which position on the home screen.

Specifically, for example, the placement position information is a placement pattern that defines, on the home screen divided into a matrix of icon placement positions (cells), which placement position in the matrix each icon is placed (see FIG. 6). In the first embodiment, there is described an example in which multiple placement patterns are stored as placement position information in the placement-information storage unit 220. Furthermore, as another example, the placement position information can be coordinate position information that defines the placement position of each icon in terms of coordinates of the icon on the touch screen 271.

Furthermore, the placement-information storage unit 220 stores therein a conditional expression for determining, out of multiple pieces of placement position information stored therein, which piece of the placement position information is selected according to device information stored in the main body 10. In the present embodiment, a conditional expression in which device information is associated with placement position information is stored in the placement-information storage unit 220; this conditional expression corresponds to correspondence information described in Claims.

Here, details of the conditional expression are explained. FIG. 5 is a diagram showing an example of the conditional expression stored in the MFP according to the first embodiment. In the conditional expression shown in FIG. 5, device information, such as the machine name and destination information, is associated with a placement pattern that is placement position information. The conditional expression shown in FIG. 5 is, for example, classified by the machine name into three categories: "Model A", "Model B or C", and "Other models", and further classified by destination information into three categories: "Destination NA", "Destination DOM", and "Other destinations".

Specifically, the conditional expression shown in FIG. 5 indicates, for example, that Pattern A is associated with destination information "NA", and placement position information is Pattern A when destination information is "NA". Furthermore, it indicates that Pattern B is associated with destination information "NA" and machine name "Metis-Cl (Model C)", and placement position information is Pattern B when destination information is "NA" and the machine name is "Metis-Cl (Model C)".

Subsequently, details of the placement position information are explained. FIG. 6 is a diagram showing an example of the placement position information stored in the MFP according to the first embodiment. As shown in FIG. 6, the placement position information indicates the placement positions of icons on the home screen, i.e., what icon is displayed in which cell of which row.

Specifically, placement position information (Pattern A) shown in FIG. 6 indicates that an icon (App A) of Application A is displayed in the first column cell of the first row, and an icon (App B) of Application B is displayed in the second column cell of the first row, followed by the third and fourth column cells. Furthermore, it indicates that an icon (App E) of Application E is displayed in the fifth column cell of the first row, an icon (App F) of Application F is displayed in the first column cell of the second row, . . . .

Referring back to FIG. 3, the applications 210*a*, 210*b*, and 210*c* are application software installed on the MFP 1.

The application managing unit 211 manages a group of applications installed on the MFP 1, and checks whether an application has been installed on the MFP 1. In the present embodiment, the application managing unit 211 checks whether an application of which the icon (placement display information) is placed according to placement position information selected by a selecting unit 2131, i.e., an application of which the icon's placement position is indicated by the placement position information has been installed on the MFP 1. The application managing unit 211 corresponds to a checking unit described in Claims.

The acquiring unit 212 acquires a variety of information from the main body 10; in the present embodiment, the acquiring unit 212 acquires, for example, device information notified by the notifying unit 112 of the main body 10 on the startup of the MFP 1.

The screen generating unit 213 generates a home screen on which a list of icons of applications is displayed based on acquired device information, and includes the selecting unit 2131 and a placing unit 2132.

The selecting unit 2131 selects placement position information corresponding to device information from multiple pieces of placement position information stored in the placement-information storage unit 220 based on device information that has been acquired from the device-information storage unit 110 and notified by the notifying unit 112 on the startup of the MFP 1. The selecting unit 2131 selects placement position information corresponding to at least either one of the destination information and model name included in the device information.

Specifically, when device information has been acquired, the selecting unit 2131 selects placement position information corresponding to the acquired device information with reference to the conditional expression stored in the placement-information storage unit 220. For example, in FIG. 5, when destination information of the MFP 1 is "NA" and the machine name is "Metis-Cl (Model C)", the selecting unit 2131 selects Pattern B that is placement position information.

The placing unit 2132 places, when the application managing unit 211 has confirmed that an application of which the icon's placement position is indicated by placement position information selected by the selecting unit 2131 has been installed on the MFP 1, the icon in the placement position on the home screen indicated by the selected placement position information.

Specifically, when it has been confirmed that Application A of which the placement position is indicated by Pattern A that is placement position information shown in FIG. 6 has been installed, the placing unit 2132 places an icon named App A in the first column cell of the first row on the home screen. On the other hand, when an application of which the icon's placement is indicated by placement position information has not been installed on the MFP 1, the placing unit 2132 leaves the placement position of the icon on the home screen indicated by the placement position information blank (in a state where no shortcut icon exists).

Figure 7:
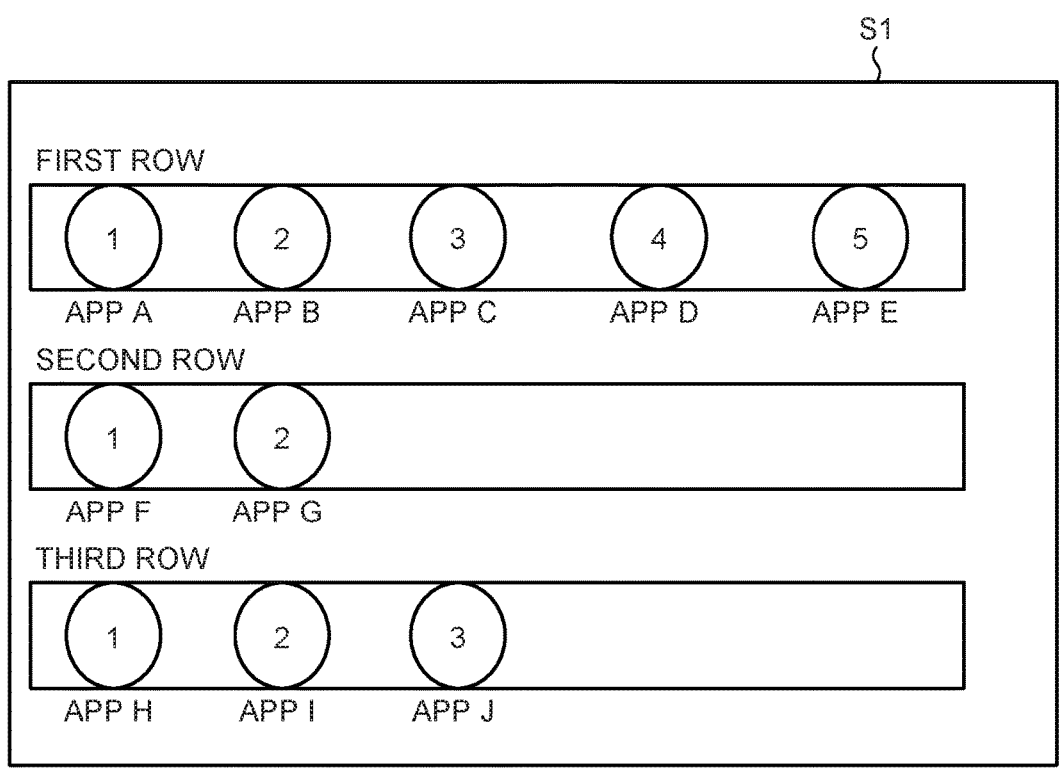
FIG. 7 is a diagram showing an example of a home screen according to the first embodiment.

The display control unit 214 controls the display of various screens and a variety of information on the touch screen 271 that is a display unit. In the present embodiment, the display control unit 214 controls, for example, the display of the home screen with icons placed by the placing unit 2132 on the touch screen 271. FIG. 7 is a diagram showing an example of the home screen according to the first embodiment. On a home screen S1 shown in FIG. 7, icons named App A, App B, App C, App D, and App E are placed in the first to fifth column cells of the first row, respectively; icons named App F and App G are placed in the first and second column cells of the second row, respectively; and icons named App H, App I, and App J are placed in the first to third column cells of the third row, respectively. The display control unit 214 displays this home screen S1 on the touch screen 271.

The input accepting unit 215 accepts various inputs made by a user through the touch screen 271 or the keyboard 272 of the operation panel 27. The control unit 216 controls the entire operation unit 20; for example, the control unit 216 controls the operation unit 20 based on an accepted input.

Subsequently, the flow of a home-screen display process performed by the MFP 1 according to the present embodiment is explained. FIG. 8 is a flowchart showing the flow of the home-screen display process performed by the MFP according to the first embodiment.

First, when the MFP 1 has been started, the device-information managing unit 111 of the main body 10 acquires device information from the device-information storage unit 110, and the notifying unit 112 notifies the operation unit 20 of the device information. Accordingly, the acquiring unit 212 acquires the device information of the MFP 1 (Step S10).

When the device information has been acquired, the selecting unit 2131 selects placement position information corresponding to the acquired device information with reference to the conditional expression stored in the placement-information storage unit 220 (Step S12). The application managing unit 211 determines whether an application of which the icon's placement position is indicated by the selected placement position information has been installed or not (Step S14).

When an application of which the icon's placement position is indicated by the placement position information has not been installed (NO at Step S14), the placing unit 2132 leaves a cell corresponding to the placement position on the home screen indicated by the placement position information blank (Step S16).

On the other hand, when an application of which the icon's placement position is indicated by the placement position information has been installed (YES at Step S14), the placing unit 2132 places an icon of the application in the placement position on the home screen indicated by the placement position information (Step S18).

The application managing unit 211 determines whether there is any subsequent application in the placement position information (Step S20). When there is a subsequent application (YES at Step S20), returning to Step S14, the process is repeated. Accordingly, the initial placement of all shortcut icons on the home screen is determined.

On the other hand, when there is no subsequent application (NO at Step S20), the display control unit 214 displays the home screen with icons placed on the touch screen 271 (Step S22).

In this manner, in the MFP 1 according to the first embodiment, placement position information corresponding to device information acquired on the startup of the MFP 1 is selected based on the conditional expression in which device information, including the destination information and model name of the MFP 1, is associated with placement position information (placement information) that indicates respective placement positions of icons. Then, the placement positions on the home screen where shortcut icons of applications installed on the MFP 1 are placed are determined according to the selected placement position information, and the home screen with all icons placed is displayed on the touch screen 271. Accordingly, even when the initial placement of shortcut icons on the home screen differs according to the destination and model of image forming apparatus, etc., common firmware can be used, so it is possible to improve production efficiency.

Second Embodiment

The MFP according to the first embodiment is configured to determine the placement positions of shortcut icons on the home screen by using placement position information and leave a cell corresponding to the placement position of a shortcut icon of a not-installed application blank. However, installed applications may differ according to model, destination information, or the functions of a controller (whether there is scanner function or fax function). Therefore, if there are not many applications installed on the MFP 1, the home screen is absolutely full of blank cells, so the home screen based on the initial placement which is not so convenient for a user is displayed. On the other hand, an MFP according to a second embodiment is configured to place shortcut icons according to placement order information that defines the order in which shortcut icons are displayed on the home screen, thereby improving the convenience.

The hardware and software configurations of the MFP according to the second embodiment are the same as in the first embodiment (see FIGS. 1 and 2). Points of difference in a functional configuration of the MFP according to the second embodiment from the MFP according to the first embodiment are explained with reference to FIG. 3.

The placement-information storage unit 220 in the second embodiment stores therein placement information that is information on the placement of icons on the home screen displayed on the touch screen 271 of the operation panel 27, and is realized by the flash memory 24 or the ROM 22. The placement information in the second embodiment is placement order information that indicates the order in which shortcut icons are displayed when placed on the home screen. In other words, the placement order information is information that defines the order in which icons are displayed according to predetermined order of placement positions on the home screen. In the second embodiment, multiple pieces of placement order information are stored in the placement-information storage unit 220.

Furthermore, on a home screen having multiple pages, a theme may be set on a page-by-page basis. For example, shortcut icons of applications using application functions of the main body 10, such as copy and scanner, are placed on the first page, and shortcut icons of applications using network functions, such as browser and mail sending, are placed on the second page, thereby making the home screen convenient for a user.

In such a case, the placement-information storage unit 220 in the present embodiment stores therein placement order information, which indicates the order in which shortcut icons are displayed when placed on the home screen, on a page-by-page basis. Then, shortcut icons of installed applications are placed on a page-by-page basis. Incidentally, in the second embodiment, it is configured that if all cells of one page have been occupied, no more shortcut icon is placed on that page.

Furthermore, the placement-information storage unit 220 stores therein a conditional expression just like the first embodiment, and the conditional expression describes conditions for selecting placement order information corresponding to device information, such as destination information or model name.

Here, details of the placement order information are explained. FIG. 9 is a diagram showing an example of the placement order information stored in the MFP according to the second embodiment. As shown in FIG. 9, the placement order information indicates the order in which icons are displayed when placed on the home screen on a page-by-page basis.

Specifically, the placement order information shown in FIG. 9 indicates that an icon (App A) of Application A is placed in the first cell (the first priority) of Page 1, an icon (App B) of Application B is placed in the second cell (the second priority) of Page 1, and an icon (App C) of Application C is placed in the third cell (the third priority) of Page 1, followed by the fourth cell, the fifth cell, . . . , and then followed by the first cell of Page 2, the second cell of Page 2, . . . .

When an application of which the icon's (placement display information's) display order is indicated by placement order information selected by the selecting unit 2131 has been installed on the MFP 1, the placing unit 2132 determines whether there is a blank cell (a blank space) in the placement position according to the predetermined order of placement positions on the home screen. Then, when having determined that there is a blank cell, the placing unit 2132 places an icon of the application in the cell in accordance with the order indicated by the placement order information. The predetermined order of placement positions on the home screen here is, for example, the order of placement positions beginning from the upper left end of a matrix on the home screen (the first column of the first row), followed by the second column of the first row, the third column of the first row, . . . , and, when all columns of the first row have been occupied, the first column of the second row, followed by subsequent columns likewise.

Furthermore, when the home screen has multiple pages, the placing unit 2132 performs the same process on a page according to predetermined order. That is, when an application of which the icon is to be placed has been installed, the placing unit 2132 determines whether there is a blank cell in the placement position on the page according to the predetermined placement-position order and the predetermined page order. Then, when having determined that there is a blank cell, the placing unit 2132 places the icon in the cell in accordance with the order indicated by the placement order information.

Figure 10:
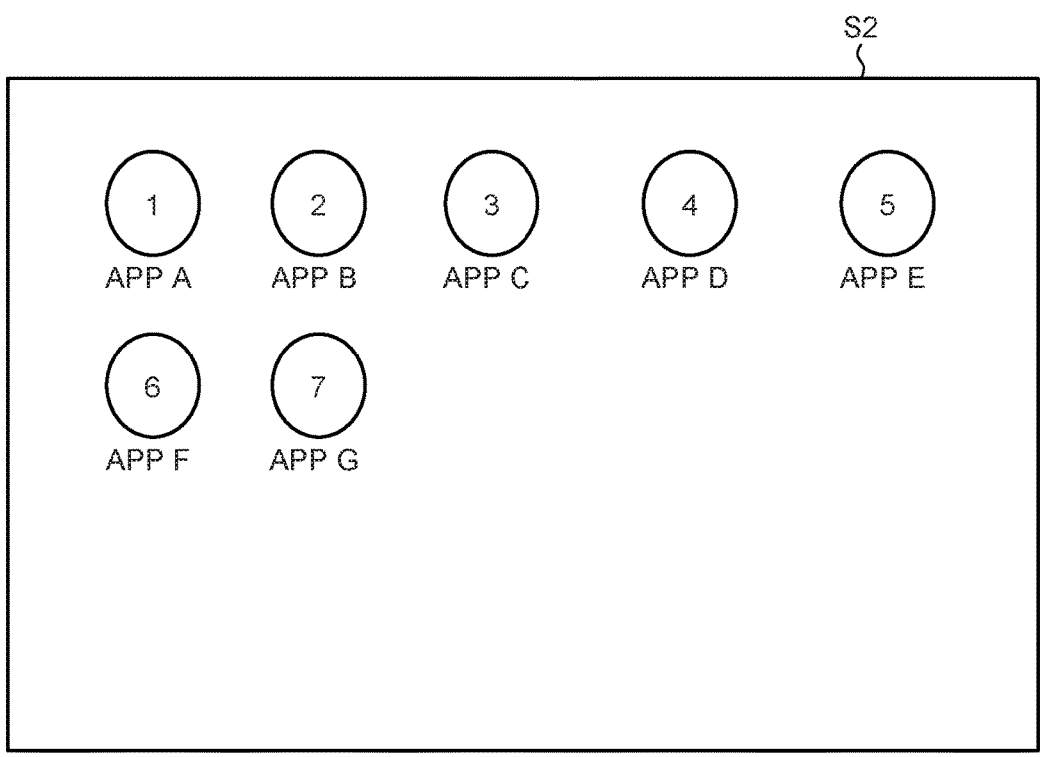
FIG. 10 is a diagram showing an example of a home screen according to the second embodiment.

Subsequently, the home screen with icons placed is explained. FIG. 10 is a diagram showing an example of the home screen according to the second embodiment. On a home screen S2 shown in FIG. 10, icons (App A, . . . , and App G) of Applications A to G are placed in the predetermined placement-position order (the first to fifth columns of the first row, the first and second columns of the second row, . . . ) in accordance with the order indicated by placement order information. The display control unit 214 displays this home screen S2 on the touch screen 271.

Figure 11:
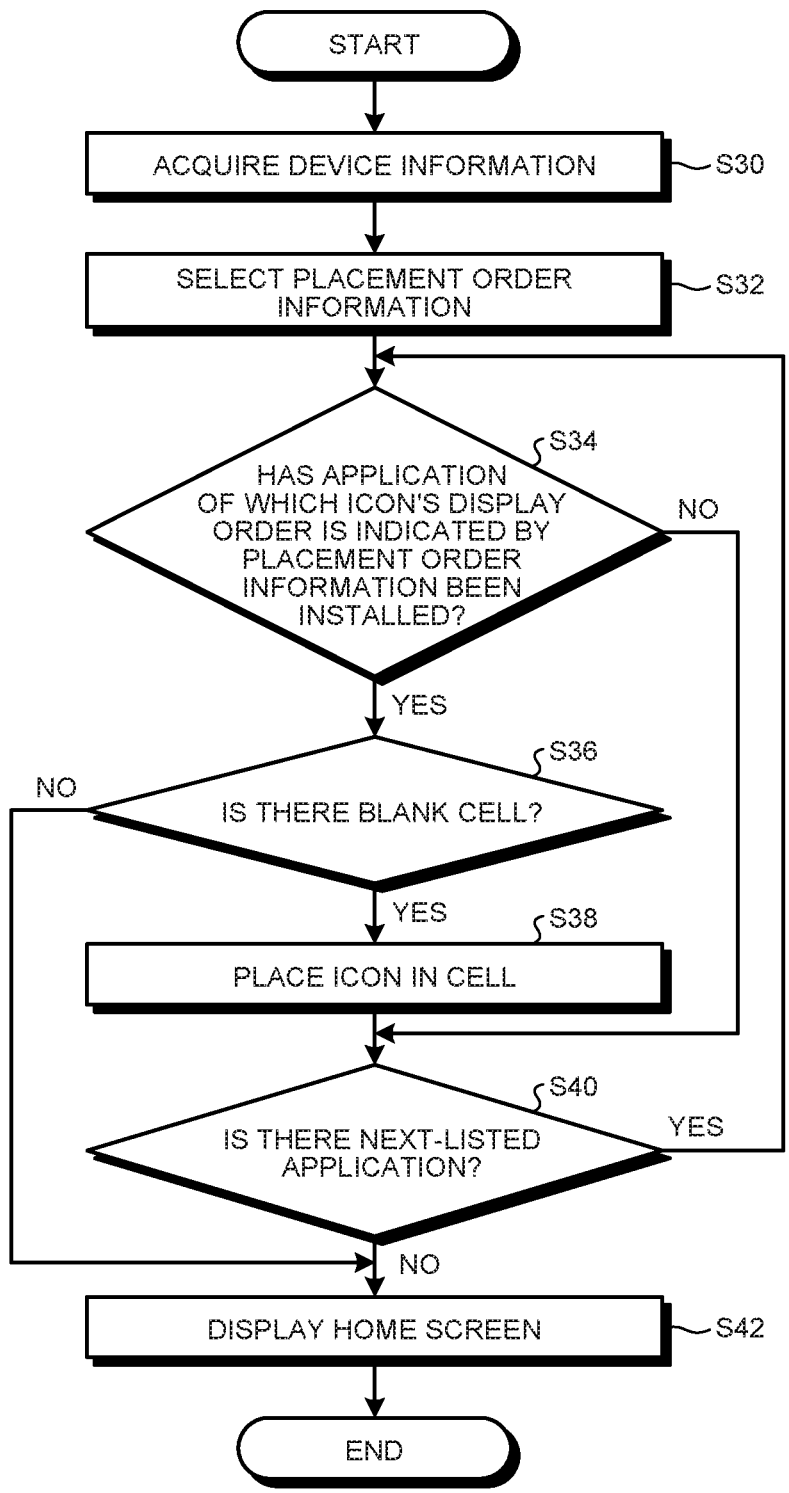
FIG. 11 is a flowchart showing the flow of a home-screen display process performed by the MFP according to the second embodiment.

Subsequently, the flow of a home-screen display process performed by the MFP 1 according to the second embodiment is explained. FIG. 11 is a flowchart showing the flow of the home-screen display process performed by the MFP according to the second embodiment.

First, when the MFP 1 has been started, the device-information managing unit 111 of the main body 10 acquires device information from the device-information storage unit 110, and the notifying unit 112 notifies the operation unit 20 of the device information. Accordingly, the acquiring unit 212 acquires the device information of the MFP 1 (Step S30).

When the device information has been acquired, the selecting unit 2131 selects placement order information corresponding to the acquired device information with reference to the conditional expression stored in the placement-information storage unit 220 (Step S32). The application managing unit 211 determines whether an application of which the icon's display order is indicated by the selected placement order information has been installed or not (Step S34).

When an application of which the icon's display order is indicated by the placement order information has not been installed (NO at Step S34), the process goes on to Step S40. On the other hand, when an application of which the icon's display order is indicated by the placement order information has been installed (YES at Step S34), the placing unit 2132 determines whether there is a blank cell in the placement position according to the predetermined order of placement positions on the home screen (Step S36).

When there is no blank cell (NO at Step S36), the process goes on to Step S42. On the other hand, when there is a blank cell (YES at Step S36), the placing unit 2132 places an icon of the application in the cell determined to be blank in accordance with the order indicated by the placement order information (Step S38).

The application managing unit 211 determines whether there is any application listed next in the placement order information (Step S40). When there is a next-listed application (YES at Step S40), returning to Step S34, the process is repeated. This prevents the home screen from being absolutely full of blank cells.

On the other hand, when there is no next-listed application (NO at Step S40), the display control unit 214 displays the home screen with icons placed on the touch screen 271 (Step S42).

Figure 12:
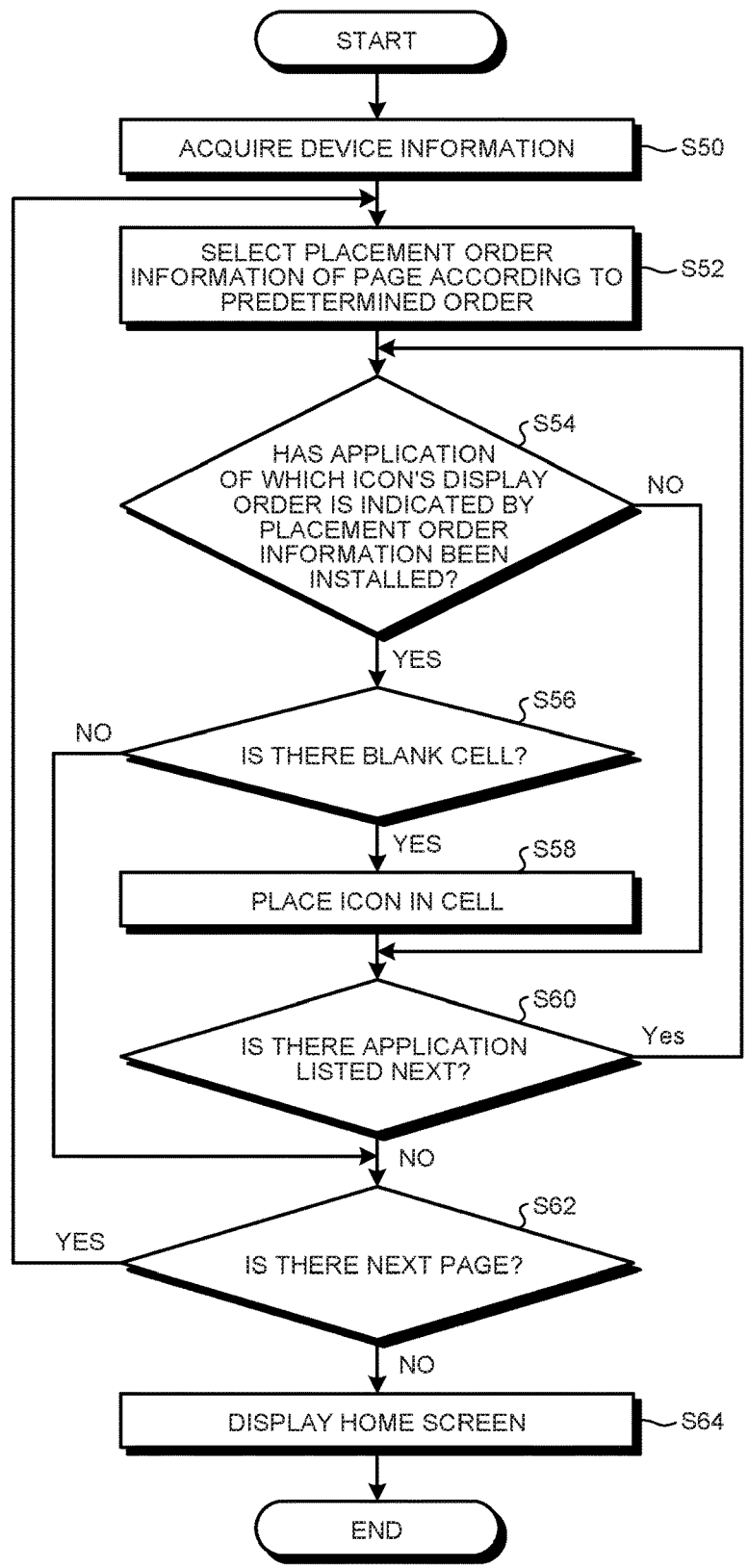
FIG. 12 is a flowchart showing the flow of a multi-page home-screen display process performed by the MFP according to the second embodiment.

Subsequently, the flow of a multi-page home-screen display process performed by the MFP 1 according to the second embodiment is explained. FIG. 12 is a flowchart showing the flow of the multi-page home-screen display process performed by the MFP according to the second embodiment.

First, when the MFP 1 has been started, the device-information managing unit 111 of the main body 10 acquires device information from the device-information storage unit 110, and the notifying unit 112 notifies the operation unit 20 of the device information. Accordingly, the acquiring unit 212 acquires the device information of the MFP 1 (Step S50).

When the device information has been acquired, the selecting unit 2131 selects placement order information of a page according to the predetermined page order that corresponds to the acquired device information with reference to the conditional expression stored in the placement-information storage unit 220 (Step S52).

Processes from the determination of whether an application has been installed to the determination of whether there is any application listed next in the placement order information (Steps S54 to S60) are the same processes as at Steps S34 to S40 in FIG. 11, so description of these processes is omitted.

Then, the selecting unit 2131 determines whether there is the next page (Step S62), and, when there is the next page (YES at Step S62), returning to Step S52, the process is repeated. On the other hand, when there is no next page (NO at Step S62), the display control unit 214 displays the home screen with icons placed on the touch screen 271 (Step S64).

In this manner, in the MFP 1 according to the second embodiment, placement order information corresponding to device information acquired on the startup of the MFP 1 is selected based on the conditional expression in which device information, including the destination information and model name of the MFP 1, is associated with placement order information (placement information) that indicates the order in which icons are displayed. Then, the order in which shortcut icons of applications installed on the MFP 1 are displayed on the home screen is determined according to the selected placement order information, and the home screen with the icons placed is displayed on the touch screen 271. Accordingly, even when the initial placement of shortcut icons on the home screen differs according to the destination and model of image forming apparatus, etc., common firmware can be used, so it is possible to improve production efficiency. Furthermore, by placing the icons according to the placement order information, the home screen is prevented from being absolutely full of blank cells, so it is possible to improve the convenience. Moreover, in the case of a multi-page home screen, icons of applications according to the model or the functions of the main body can be placed on a page-by-page basis.

Third Embodiment

The MFP according to the first embodiment is configured to determine the placement positions of shortcut icons on the home screen by using placement position information on the startup of the MFP. On the other hand, in an MFP according to a third embodiment, when an additional application has been installed afterward, a shortcut icon of the newly-added application is placed on the home screen.

The hardware and software configurations of the MFP according to the third embodiment are the same as in the first embodiment (see FIGS. 1 and 2). Points of difference in a functional configuration of the MFP according to the third embodiment from the MFP according to the first embodiment are explained with reference to FIG. 3. Incidentally, in the present embodiment, a newly-added application is attached with placement information, which indicates the position on the home screen where an icon of the application is placed, and a placement instruction to place the icon on the home screen.

In addition to the function described in the first embodiment, the application managing unit 211 further checks whether a new application has been installed on the MFP 1.

In addition to the function described in the first embodiment, the placing unit 2132 places, when a new application has been installed, an icon of the new application in the placement position on the home screen indicated by placement information attached to the new application.

Figure 13:
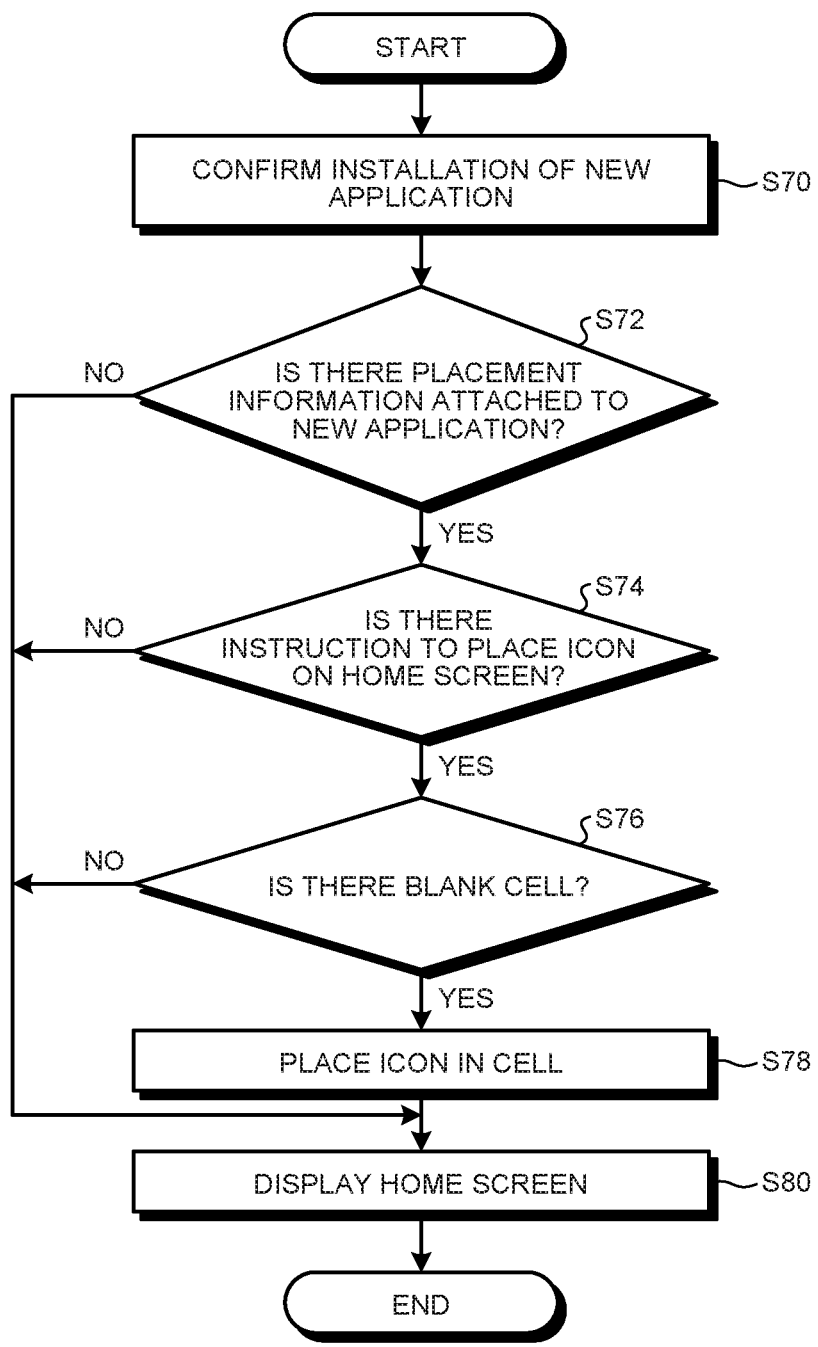
FIG. 13 is a flowchart showing the flow of a home-screen display process performed by an MFP according to a third embodiment of the present invention.

Subsequently, the flow of a home-screen display process performed by the MFP 1 according to the third embodiment is explained. FIG. 13 is a flowchart showing the flow of the home-screen display process performed by the MFP according to the third embodiment.

First, when the application managing unit 211 has confirmed that a new application has been installed on the MFP 1 (Step S70), the placing unit 2132 determines whether there is placement information attached to the new application (Step S72). When there is no placement information attached (NO at Step S72), the process goes on to Step S80.

On the other hand, when there is placement information attached (YES at Step S72), the placing unit 2132 determines whether there is a placement instruction to place an icon on the home screen (Step S74). When there is no placement instruction (NO at Step S74), the process goes on to Step S80.

On the other hand, when there is a placement instruction (YES at Step S74), the placing unit 2132 determines whether there is a blank cell in the placement position on the page of the home screen indicated by the placement information according to the predetermined placement-position order (Step S76). When there is no blank cell (NO at Step S76), the process goes on to Step S80.

On the other hand, when there is a blank cell (YES at Step S76), the placing unit 2132 places an icon of the new application in the cell determined to be blank (Step S78). Then, the display control unit 214 displays the home screen with the icon placed on the touch screen 271 (Step S80).

In this manner, in the MFP 1 according to the third embodiment, when a new application has been added, the placement position of a shortcut icon of the new application on the home screen is determined according to placement information attached to the new application, and the home screen with the additional icon newly placed is displayed on the touch screen 271. Accordingly, even when the initial placement of shortcut icons on the home screen differs according to the destination and model of image forming apparatus, etc., common firmware can be used, so it is possible to improve production efficiency. Furthermore, by placing an icon of a newly-added application, the home screen with further improved convenience can be displayed.

Incidentally, a program executed by the MFP according to the present embodiments is built into the ROM or the like in advance. Alternatively, the program executed by the MFP according to the present embodiments can be provided in such a manner that the program is recorded on a non-transitory computer-readable recording medium, such as a CD-ROM, a flexible disk (FD), a CD-R, or a digital versatile disk (DVD), in an installable or executable file format.

Furthermore, the program executed by the MFP according to the present embodiment can be provided in such a manner that the program is stored on a computer connected to a network such as the Internet so that the program can be downloaded via the network. Moreover, the program executed by the MFP according to the present embodiment can be provided or distributed via a network such as the Internet.

The program executed by the MFP according to the present embodiment is composed of modules including the above-described units (the device-information managing unit 111, the notifying unit 112, the acquiring unit 212, the application managing unit 211, the screen generating unit 213, and the display control unit 214); the CPU (processor) as actual hardware reads out the program from the ROM and executes the program, thereby the above-mentioned units are loaded onto main storage, and the above-mentioned units are generated on the main storage. Furthermore, for example, some or all functions of the above-mentioned units can be realized by hardware circuitry.

According to the embodiments of the present invention, even when the initial placement of shortcut icons differs according to the destination and model of image forming apparatus, etc., it is possible to use common firmware, thereby improving production efficiency.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus, comprising:
    a display in the image forming apparatus having a home screen divided into a matrix of cells into which displayed icons may be positioned;
    a main body of image forming apparatus that supplies power to an operation hardware of the image forming apparatus, wherein
    the main body of the image forming apparatus includes a first memory storing computer-readable instructions and device information on the image forming apparatus including at least model identification information of the image forming apparatus; and
    one or more processors configured to execute the computer-readable instructions such that the one or more processors are configured to perform operations including notifying the operation hardware of the device information acquired from the main body on startup of the image forming apparatus, and
    the operation hardware of the image forming apparatus includes a second memory storing computer-readable instructions and placement information, which is information indicating placement positions of icons on the home screen in a particular cell, and correspondence information in which the device information is associated with the placement information; and one or more processors configured to execute the computer-readable instructions such that the one or more processors are configured to perform operations including, acquiring the device information from the main body;

selecting placement information corresponding to the acquired device information from pieces of placement information stored in the second memory;

checking whether an application of placement display information, which is a piece of display information placed based on the selected placement information, has been installed on the image forming apparatus;

placing, when the application of the placement display information has been installed, the icons in accordance with the placement display information and the device information on a display information screen, which is a screen on which one or more pieces of display information are displayed, based on the selected placement information; and displaying the display information screen with the icons arranged in accordance with the placement display information and the device information placed on the display, wherein the device information includes destination information, which indicates a location where the image forming apparatus is used, and a model name of the image forming apparatus.

2. The image forming apparatus according to claim 1, wherein the placement information is placement position information that indicates a placement position of placement display information on the display information screen, and wherein the one or more processors of the operation hardware are further configured to select placement position information corresponding to at least either one of the destination information and the model name, and place the placement display information in the placement position on the display information screen indicated by the selected placement position information.

3. The image forming apparatus according to claim 2, wherein when the application of the placement display information has not been installed, the one or more processors of the operation hardware are further configured to leave the placement position on the display information screen indicated by the selected placement position information blank.

4. The image forming apparatus according to claim 1, wherein the placement information is placement order information that indicates the order in which pieces of placement display information are displayed when placed on the display information screen, and when the application of the placement display information has been installed, the one or more processors of the operation hardware are further configured to determine a blank space on the display information screen in predetermined order, and places the placement display information in a space determined to be blank in accordance with the order indicated by the placement order information.

5. The image forming apparatus according to claim 4, wherein the display information screen has multiple pages broken down by theme, the second memory stores therein the placement order information on a page-by-page basis, and the one or more processors of the operation hardware are further configured to determine a blank space on each page of the display information screen in the predetermined order on a page-by-page basis, and places placement display information in a space determined to be blank in accordance with the order indicated by the placement order information corresponding to the page.

6. The image forming apparatus according to claim 1, wherein the one or more processors of the operation hardware are further configured to check whether a new application has been installed on the image forming apparatus, and when a new application has been installed, the one or more processors of the operation hardware are further configured to place display information of the new application in the placement position on the display information screen indicated by placement information attached to the new application.

7. The image forming apparatus according to claim 1, wherein the operation hardware is configured to be operatively removable from the main body.

8. The image forming apparatus according to claim 7, wherein when the operation hardware accumulates electric power supplied from the main body via a communication path in a secondary battery, and, when removed from the main body, operates using the electric power accumulated in the secondary battery and performs communication with the main body.

9. An information processing method implemented by operation hardware of an image forming apparatus, the operation hardware including a memory configured to store therein placement information, which is information on placement of display information associated with an instruction to process an application available in the image forming apparatus, and correspondence information in which device information on the image forming apparatus is associated with the placement information, the information processing method comprising:

acquiring the device information including at least model identification information of the image forming apparatus and a location where the image forming apparatus is used;

selecting placement information indicating placement positions of icons on a home screen in a particular cell and corresponding to the acquired device information from pieces of placement information stored in the memory of the operation hardware;

checking whether an application of placement display information, which is a piece of display information placed based on the selected placement information, has been installed on the image forming apparatus;

placing, when the application of the placement display information has been installed, the placement display information in accordance with the placement information and the device information on a display information screen, which is a screen on which one or more pieces of display information are displayed, based on the selected placement information; and displaying the display information screen with the placement display information placed on a display of the image forming apparatus.

10. A non-transitory computer-readable recording medium having a computer program executed by a computer including a memory configured to store therein placement information, which is information on placement of display information associated with an instruction to process an application available in the computer, and correspondence information in which device information on the computer is associated with the placement information, the program causing the computer to execute:
- acquiring the device information including at least model identification information of an image forming apparatus and a location where the image forming apparatus is used;
- selecting placement information indicating placement positions of icons on a home screen in a particular cell and corresponding to the acquired device information from pieces of placement information stored in the memory of operation hardware;
- checking whether an application of placement display information, which is a piece of display information placed based on the selected placement information, has been installed on the computer;
- placing, when the application of the placement display information has been installed, the placement display information in accordance with the placement information and the device information on a display information screen, which is a screen on which one or more pieces of display information are displayed, based on the selected placement information; and
- displaying the display information screen with the placement display information placed on a display.

* * * * *